Nov. 17, 1936.  G. J. KARLE, SR  2,061,237
GROOVING SAW
Filed May 7, 1935
Fig.1.
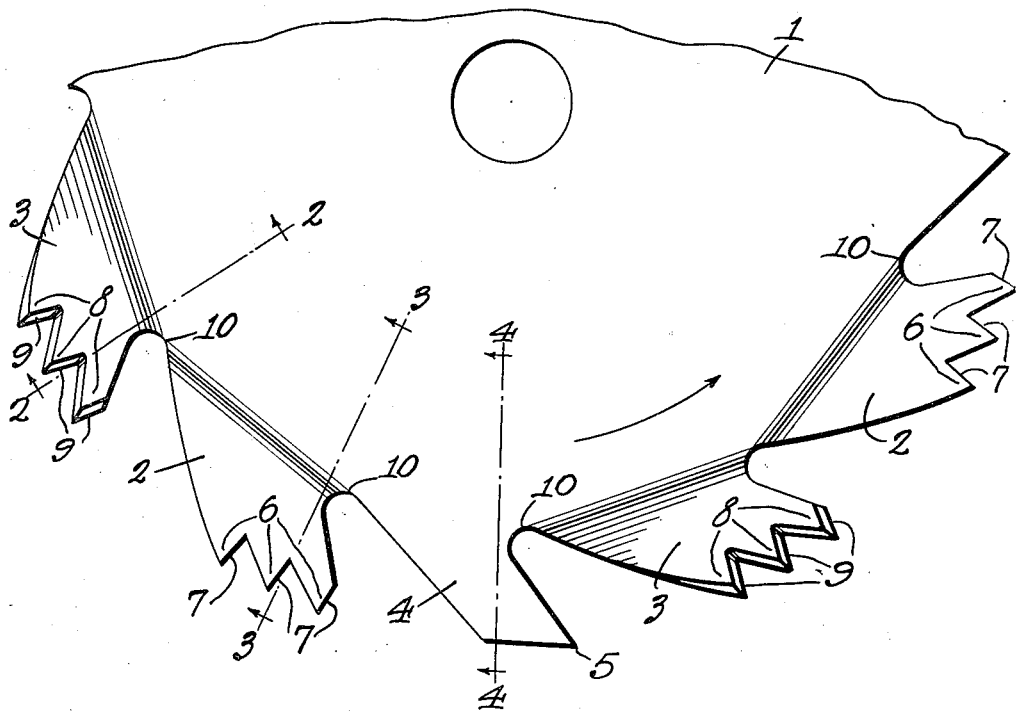
Fig.2. Fig.3. Fig.4. Fig.5.
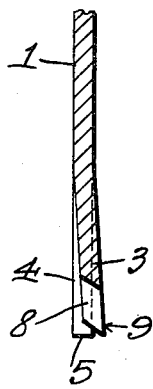 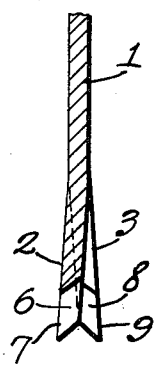 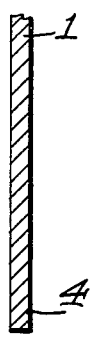 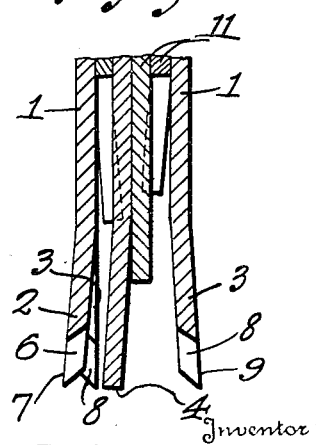
Inventor
George J. Karle, Sr.
By C. A. Snow & Co.
Attorneys Patented Nov. 17, 1936

2,061,237

UNITED STATES PATENT OFFICE 2,061,237

GROOVING SAW

George J. Karle, Sr., Buffalo, N. Y.

Application May 7, 1935, Serial No. 20,245

1 Claim. (Cl. 143—133)

This invention relates to a grooving saw and while it is capable of use by itself for grooving purposes, it can also be employed as the outside saw of a dado head.

Heretofore saws of this type have generally been of such thickness that they could not be stamped out of sheet material and the production has been costly not only because of the weight of metal used but also because of the number of operations required to complete the saw.

Grooving saws thus far produced have also been objectionable because it has been the practice to set the teeth either by offsetting the teeth only or else swaging the teeth. Both of these types of saws have been undesirable because of the frequency with which the teeth must be sharpened and set.

It is an object of the present invention to overcome the objections above stated by providing a grooving saw the teeth of which are arranged in groups at the outer ends of tooth sections and instead of offsetting or swaging the small cutting teeth at the ends of the sections, it is designed, in the present instance, to offset the entire section outwardly from the throat or "gullet" portion whereby it becomes possible to wear the cutting teeth practically down to the base of each section without additionally offsetting and yet maintain desirable clearances at the sides of the saw.

A still further object is to provide a grooving saw which can be stamped out of sheet metal and does not require polishing or grinding the side surfaces in order to obtain clearance.

A further object is to provide a grooving saw especially adapted for use as the outside saw of a dado head.

A still further object is to provide a grooving saw which will give longer service than other saws before wearing out and which has combined with the cross cut teeth of the sections, raker teeth which are interposed between certain sections.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing

Figure 1 is a side elevation of a portion of the grooving saw constituting the present invention.

Figure 2 is a section on line 2—2 Figure 1.

Figure 3 is a section on line 3—3 Figure 1, the next section in the background being shown in elevation.

Figure 4 is a section on line 4—4 Figure 1.

Figure 5 is a transverse section through a portion of a dado head having the present improvements combined with chippers such as commonly employed.

Referring to the figures by characters of reference, 1 designates a saw blade formed preferably of sheet steel properly tempered and of $\frac{1}{15}''$ thickness so that it is thus possible to shape the entire saw by punching or stamping.

Extended from the periphery of the blade of the saw are toothed sections 2 and 3 arranged in pairs, the pairs being spaced apart sufficient distances to permit the formation of rakers 4 between the pairs. The rakers 4 are not offset but occupy the same plane as the blade 1 and have sharp advancing edges 5 for plowing through the groove produced by the teeth on the sections 2 and 3 in advance thereof.

The outer portion of each section 2 is formed with three cross cut teeth 6 each of which has an advancing cutting edge 7 at one side of the tooth. The entire section 2 is offset laterally so that said sides of the teeth extending to the cutting edges 7 will be supported laterally beyond one surface of the blade 1. The section 3 is offset relative to blade 1 beyond the offset side of the blade and it also has three cross cut teeth 8 at its outer edge the advancing cutting edges 9 of which occupy the same plane as that side of the section offset beyond the blade 1.

The amount of offset of the two blades will depend upon the wishes and judgment of the user and it will be apparent that in one operation these offsets and their teeth as well as the rakers can be stamped out of the same sheet of metal as the blade 1 and following the stamping operation and the offsetting of the sections 2 and 3, the saw will be ready for use after the teeth have been sharpened.

Obviously when the saw is rotated the toothed offset sections 2 and 3 will cut into the wood and form the sides of the groove while the raker 4 will remove the loosened chips from the groove. As the sections are offset down to the throats or "gullets" 10, the proper clearance will be maintained at all times until the teeth 6 and 8 have been worn down to the blade 1. The amount of clearance can of course be regulated at will by increasing or reducing the offset of each section.

In Figure 5 two side saws such as have already been described are shown combined with interposed chippers 11 which can be of the usual construction thus to produce the dado head. When the saws are used in this combination it is not always necessary to offset those sections which ordinarily would be extended toward the chippers. Instead only the remaining sections which normally would be offset outwardly need be offset. Therefore the proper clearance will be maintained during the cutting operation. The chippers generally are offset from their gullets in the same manner as are the teeth of the saws.

What is claimed is:

A one-piece sheet metal grooving saw including a circular blade having marginal toothed sections spaced throughout their depths, said sections being arranged in pairs, and raker teeth between and spaced from the pairs of sections, each raker tooth having a sharp advancing edge and occupying the same plane with the blade, all of the toothed sections and raker teeth cooperating to form gullets between the base portions thereof, one of the toothed sections of each pair being offset uniformly beyond one face of the blade along lines connecting the gullets at the base thereof, while the other section of said pair is offset uniformly beyond the opposite face of the blade along lines connecting the gullets at the base thereof, the cutting edges of all of the teeth on all of the sections being equidistant from the plane of rotation of the blade GEORGE J. KARLE, Sr.